United States Patent
Park

(10) Patent No.: US 8,805,177 B2
(45) Date of Patent: Aug. 12, 2014

(54) CAMERA MODULE AND LIGHT BLOCKING LAYER FORMING METHOD THEREOF

(71) Applicant: LG Innotek Co., Ltd., Seoul (KR)

(72) Inventor: Jong Min Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/098,144

(22) Filed: Dec. 5, 2013

(65) Prior Publication Data

US 2014/0161432 A1 Jun. 12, 2014

(30) Foreign Application Priority Data

Dec. 6, 2012 (KR) .................. 10-2012-0141204

(51) Int. Cl.
*G03B 13/34* (2006.01)

(52) U.S. Cl.
USPC .......................................................... 396/133

(58) Field of Classification Search
USPC .............. 396/85, 133; 348/340, 345; 359/824
See application file for complete search history.

(56) References Cited

U.S. PATENT DOCUMENTS

| | | | | |
|---|---|---|---|---|
| 7,680,408 B2* | 3/2010 | Chang | ............................ | 396/133 |
| 2004/0227838 A1* | 11/2004 | Atarashi et al. | ................ | 348/340 |
| 2006/0146170 A1* | 7/2006 | Saito et al. | ..................... | 348/340 |
| 2007/0127914 A1* | 6/2007 | Chang | ............................ | 396/505 |
| 2008/0037143 A1* | 2/2008 | Yoon | .............................. | 359/824 |
| 2009/0303617 A1* | 12/2009 | Chang | ............................ | 359/739 |
| 2010/0247086 A1* | 9/2010 | Tallaron et al. | ................ | 396/133 |
| 2013/0293772 A1* | 11/2013 | Kim | ................................ | 348/374 |

* cited by examiner

*Primary Examiner* — W B Perkey

(74) *Attorney, Agent, or Firm* — Birch, Stewart, Kolasch & Birch, LLP

(57) ABSTRACT

A camera module according to exemplary embodiments of the present disclosure includes a lens holder configured to support a plurality of sheets of lenses, an actuator configured to be arranged at an upper surface of the lens holder, an outermost lens configured to move along an optical axis by the actuator, and a light blocking layer configured to be positioned on a surface of the outermost lens.

12 Claims, 2 Drawing Sheets

US 8,805,177 B2

CAMERA MODULE AND LIGHT BLOCKING LAYER FORMING METHOD THEREOF

Pursuant to 35 U.S.C. §119 (a), this application claims the benefit of earlier filing date and right of priority to Korean Patent Application No. 10-2012-0141204, filed on Dec. 6, 2012, the contents of which are hereby incorporated by reference in their entirety.

BACKGROUND OF THE DISCLOSURE

1. Field

The teachings in accordance with the exemplary embodiments of this present disclosure generally relate to a camera module and a light blocking layer forming method of the camera module.

2. Background

Recently, demand on small-sized camera modules is high as image input devices for various multimedia fields such as tablet computers, camera phones, PDAs(Personal Digital Assistants), smart phones, toys, monitoring cameras and video tape recorders. Particularly, the smart phones require small-sized camera modules in response to increased demand by consumers preferring miniaturized designs.

The camera module is generally manufactured using an image sensor chip or a photoelectric conversion device of a CCD (Charge Coupled Device) type or a CMOS (Complementary Metal Oxide Semiconductor) type to converge light from an object to a photosensitive element through a lens and to form an image of the object on a display medium such as an LCD (Liquid Crystal Display) display device.

SUMMARY

An object of the present disclosure is to provide a camera module integrally formed with a light blocking layer to allow forming an aperture on an outermost lens of an auto focusing unit using lens movement or on a moving lens.

In order to achieve at least the above object, in whole or in part, and in accordance with the purposes of the disclosure, as embodied and broadly described, and in one general aspect of the present disclosure, there is provided a camera module, the camera module comprising:
a lens holder configured to support a plurality of sheets of lenses;
an actuator configured to be arranged at an upper surface of the lens holder;
an outermost lens configured to move along an optical axis by the actuator; and
a light blocking layer configured to be positioned on a surface of the outermost lens.

Preferably, but not necessarily, the light blocking layer may be formed by any one method of painting or stamping on the surface of the outermost lens.

Preferably, but not necessarily, the light blocking layer may be positioned on at least one of an exposed surface of the outermost lens and a non-exposed floor surface opposite to the lens.

Preferably, but not necessarily, a holder cover may be interposed between the lens holder and the actuator.

Preferably, but not necessarily, the holder cover may be conductibly connected to the actuator.

Preferably, but not necessarily, the light blocking layer may take a shape of a disc centrally formed with a through hole.

Preferably, but not necessarily, the actuator may be any one of a micro actuator, a liquid crystal lens, a piezoelectric polymer lens, a non-MEMS (Micro Electro Mechanical System) actuator, a MEMS actuator, a silicon type actuator and a liquid lens.

In another general aspect of the present disclosure, there is provided a light blocking layer forming method of a camera module, the method comprising:
forming a light blocking stamping surface on a substrate;
contacting a master mold formed with a ring-shaped lug to the light blocking stamping surface;
forming a light blocking layer by transcribing the light blocking layer on the lug using a surface energy difference; and
forming the ring-shaped light blocking layer on an exposed outermost lens surface by contacting the ring-shaped light blocking layer transcribed on the lug to an outermost lens surface activated by an actuator and by transcribing the light blocking layer to the outermost lens surface using a surface energy difference.

Preferably, but not necessarily, the step of transcribing the light blocking layer may include aligning a center of the outermost lens to a center of the ring-shape lug.

Preferably, but not necessarily, the step of transcribing the light blocking layer may include aligning a distal end of the ring-shaped lug to a periphery of the outermost lens by forming a diameter of the ring-shaped lug corresponding to a diameter of the outermost lens.

Preferably, but not necessarily, the step of transcribing the light blocking layer to the outermost lens surface may include transcribing the light blocking layer to an exposed upper surface of the outermost lens.

Preferably, but not necessarily, the step of transcribing the light blocking layer to the outermost lens surface may include transcribing the light blocking layer to an exposed surface of the outermost lens.

The present disclosure has an advantageous effect in that an outermost lens moving for auto focusing function is formed with an aperture using a light blocking layer to simplify a manufacturing process thereby dispensing with inconvenience of forming an aperture using a separate film member.

Another advantageous effect is that a lens weight can be reduced compared with a lens using a conventional light blocking layer to thereby improve a response characteristic of an auto focusing unit.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, exemplary embodiment of the present disclosure will be described in detail with reference to the accompanying drawings.

Figure 1:
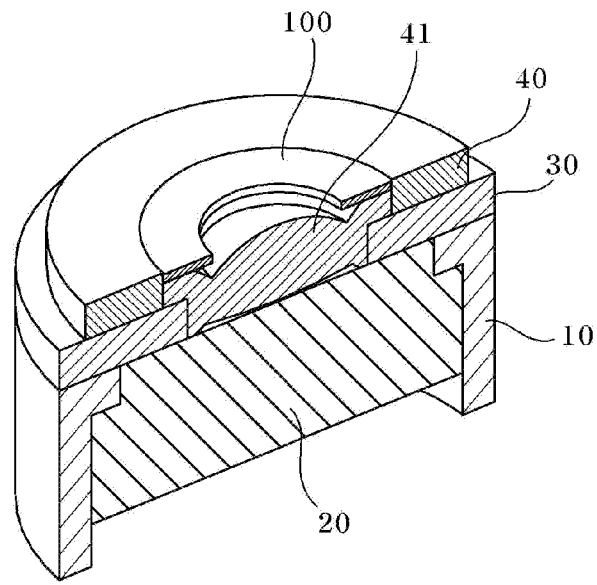
FIG. 1 is a schematic cross-sectional view illustrating a camera module according to an exemplary embodiment of the present invention.

FIG. 1 is a schematic cross-sectional view illustrating a camera module according to an exemplary embodiment of the present invention, and FIGS. 2 to 6 are schematic views illustrating a method of forming a light blocking layer on an outermost lens according to an exemplary embodiment of the present invention.

Referring to FIGS. 1 to 6, a camera module includes an auto focusing unit using a lens movement, and may further include a lens holder (10), at least one sheet of lens (20), a holder cover (30), an actuator (40) and a light blocking layer (100).

The lens holder (10) may be installed therein with at least one sheet of lens (20), each lens (20) having a different diameter and a shape. The lens holder (10) may be injection-molded using a resin material, and approximately take a shape of a cylinder. Although the lens holder (10) may take a shape of a circular cylinder according to configuration of a camera module, the present disclosure is not limited thereto, and the lens holder (10) may take a shape of a multi-angled pillar, a dual-angled cylinder and a triple-angled cylinder.

Meantime, the lens (20) may be formed with a lens group consisting of different shapes of lenses, where each lens may be overlapped at a center. Albeit not being illustrated, optical parts such as shutters and apertures may be separately installed.

The holder cover (30) may function to close an opening at an upper side of the lens holder (10) and prevents the lenses (20) from being exposed to outside. The holder cover (30) may be installed at an upper side with a lens-moving type actuator (40). To this end, the holder cover (30) may be conductively connected to the activator (40). For example, a separate wired connection member such as CF-PCB may be provided, and an electronic circuit pattern layer may be provided on a surface of the holder cover (30), the lens holder (10) or the lens (30). The holder cover (30) may be centrally formed with a through hole, where a diameter of the through hole may ge greater than that of an outermost lens (41, described later).

The technology of forming an electronic circuit pattern layer on the surface may be largely classified into three methods.

First, a first method is a patterning method through an over-molding which is a process that is used in manufacturing forms to create parts and improve product efficiency. That is, the over-molding or two-shot molding is an injection molding process using two separate molds of which one material is molded over another material. In this case, a part forming the lens (20) is used with one material and a part forming the electronic circuit pattern layer is used with another material, where two parts are injection-molded.

In this case, the lens (20) is molded with an insulating material while the electronic circuit pattern layer is molded using a conductive synthetic resin. Alternatively, a part to be formed with the electronic circuit pattern layer is molded using synthetic resin capable of being easily metal-plated, the lens (20) is injection-molded, to finish the electronic circuit pattern layer using a post-processing such as a plating process.

A second method is such that, the lens (20) is injection-molded while containing impurities reacting to light and heat, the injection-molded lens (20) is formed with a wiring pattern where the electronic circuit pattern layer is to be formed, using surface patterning work such as laser exposure. When the electronic circuit pattern layer is formed using the above-mentioned method, an SMD (Surface-Mount Device) or accessory electronic parts can be directly mounted because the electronic circuit pattern layer itself has a conductible property.

A third method is a method allowing formation of a 3-D PCB on an injection-molded substrate using fine-pitch laser patterning, giving excellent thermal and electrical properties. In this case, a front is metalized, and a non-circuit part is etched and patterned. To be more specific, an entire surface of the lens (20) is metalized, where only a part forming the electronic circuit pattern layer is left untouched, and balance is etched to integrally form the electronic circuit pattern layer on the surface of the lens (20).

Referring to FIG. 1, when an electronic circuit pattern layer is formed on the surface of the lens (20), there is no need of installing a separate conductive connection member, and the actuator (40) and a distal end of an image sensor can be directly connected, using the electronic circuit pattern layer formed on the surface of the lens (20) and distal ends (not shown) formed at both ends of the electronic circuit pattern layer, whereby a mounting space for parts installation can be advantageously reduced when miniaturized electronic parts are assembled, and assembly process can be simplified.

The actuator (40) may vertically move one sheet of the outermost lens (41) relative to an optical axis, or may adjust a focus of an image by changing a shape of the outermost lens (41) and changing a refractive index of light passing through the outermost lens (41). The actuator may be any one of a micro actuator, a liquid crystal lens, a piezoelectric polymer lens, a non-MEMS (Micro Electro Mechanical System) actuator, a MEMS actuator, a silicon type actuator and a liquid lens. However, the present disclosure is not limited thereto, and an actuator of MEMS type may be also used.

The light blocking layer (100) may be formed with a material that does not pass light to an exposed surface of the outermost lens (41). At this time, the light blocking layer (100) may be formed by using a surface energy difference such as stamping or painting method, dispensing with a separate film material.

Figure 2:
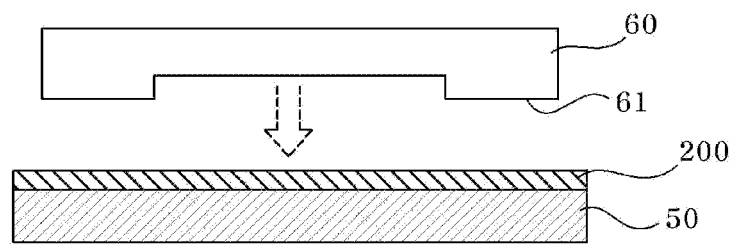
FIGS. 2 to 6 are schematic views illustrating a method of forming a light blocking layer on an outermost lens according to an exemplary embodiment of the present invention.
Figure 3:
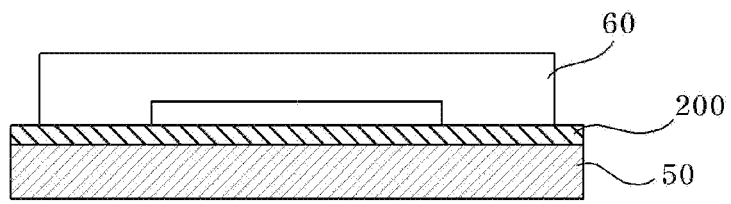

That is, as illustrated in FIG. 2, a light blocking stamping surface (200) is formed on a surface of a substrate (50) and a predetermined master mold (60) may be contacted to the light blocking stamping surface (200). At this time, a surface opposite to the substrate (50) of the master mold (60) may be formed with a ring-shaped lug (61) where a distal cross-section of the lug (61) may contact the light blocking stamping surface (200) coated on the surface of the substrate (50) as illustrated in FIG. 3.

Figure 4:
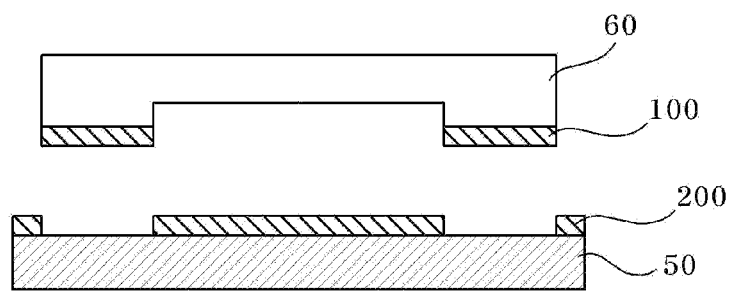
Figure 5:
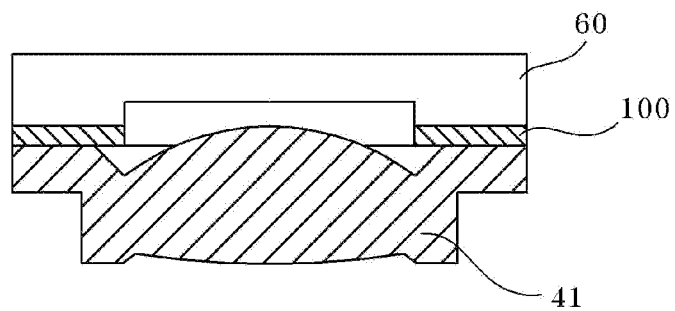
Figure 6:
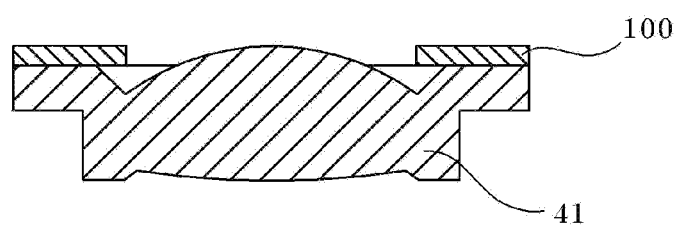

Referring to FIG. 4, when the lug (61) is brought into contact with the light blocking stamping surface (200), the light blocking layer (100) separated from the light blocking stamping surface (200) may be moved in a ring shape to each distal cross-sectional surface of the lug (61). Referring to FIG. 5, the moved light blocking layer (100) may move the master mold (60) to an upper surface side of the outermost lens (41) to allow a distal end of the lug (61) formed with the light blocking layer (100) to contact an upper surface of the outermost lens (41), whereby the light blocking layer (100) can be moved to an exposed surface of the outermost lens (41) like an act of stamping. Then, as illustrated in FIGS. 1 to 6, the light blocking layer (100) is transcribed and attached to the upper surface of the outermost lens (41).

The configuration thus described above can improve a response of the actuator that uses movement of a single lens, because the weight of the outermost lens can be reduced over a configuration of a light blocking film being attached on a surface of a conventional lens. Particularly, the configuration thus described above can greatly improve performance of a structure where a lens weight has a great influence on response characteristics and reliability.

That is, an aperture can be integrally formed on an outermost lens of an auto focusing unit using lens movement or on a moving lens according to exemplary embodiments of the present disclosure.

Furthermore, a process of storing and transporting a light blocking film after the light blocking film is formed using a fine process, and a process of attaching the film to a lens surface can be omitted to thereby improve an operational accuracy and reduce the number of processes.

Still furthermore, there is an advantageous aspect in terms of operational accuracy and automation, because a center of the master mold (60) and a center of the outermost lens (41) are aligned and mutually contacted to form the light blocking layer (100) according to the exemplary embodiments of the present disclosure, although there is a high probability of generating a defect to lens due to existence of mechanical tolerances, when a film is attached while a center of a through hole centrally formed at a light blocking member and a center of a lens are accurately matched and, when a light blocking member is formed using a separate member such as a film.

The previous description of the present disclosure is provided to enable any person skilled in the art to make or use the inventive disclosure. Various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

What is claimed is:

1. A camera module, the camera module comprising:
    a lens holder configured to support a plurality of sheets of lenses;
    an actuator configured to be arranged at an upper surface of the lens holder;
    an outermost lens configured to move along an optical axis by the actuator; and
    a light blocking layer configured to be positioned on a surface of the outermost lens.

2. The camera module of claim 1, wherein the light blocking layer is formed by any one method of painting or stamping on the surface of the outermost lens.

3. The camera module of claim 1, wherein the light blocking layer is positioned on at least one of an exposed surface of the outermost lens and a non-exposed floor surface opposite to the lens.

4. The camera module of claim 1, wherein a holder cover is interposed between the lens holder and the actuator.

5. The camera module of claim 4, wherein the holder cover is conductibly connected to the actuator.

6. The camera module of claim 1, wherein the light blocking layer takes a shape of a disc centrally formed with a through hole.

7. The camera module of claim 1, wherein the actuator is any one of a micro actuator, a liquid crystal lens, a piezoelectric polymer lens, a non-MEMS (Micro Electro Mechanical System) actuator, a MEMS actuator, a silicon type actuator and a liquid lens.

8. A light blocking layer forming method of a camera module, the method comprising:
    forming a light blocking stamping surface on a substrate;
    contacting a master mold formed with a ring-shaped lug to the light blocking stamping surface;
    forming a light blocking layer by transcribing the light blocking layer on the lug using a surface energy difference; and
    forming the ring-shaped light blocking layer on an exposed outermost lens surface by contacting the ring-shaped light blocking layer transcribed on the lug to an outermost lens surface activated by an actuator and by transcribing the light blocking layer to the outermost lens surface using a surface energy difference.

9. The method of claim 8, wherein the step of transcribing the light blocking layer includes aligning a center of the outermost lens to a center of the ring-shape lug.

10. The method of claim 8, wherein the step of transcribing the light blocking layer includes aligning a distal end of the ring-shaped lug to a periphery of the outermost lens by forming a diameter of the ring-shaped lug corresponding to a diameter of the outermost lens.

11. The method of claim 8, wherein the step of transcribing the light blocking layer to the outermost lens surface includes transcribing the light blocking layer to an exposed upper surface of the outermost lens.

12. The method of claim 8, wherein the step of transcribing the light blocking layer to the outermost lens surface includes transcribing the light blocking layer to an exposed surface of the outermost lens.

* * * * *